Oct. 8, 1968
A. B. NIX
3,404,591
SOLID PROPELLANT CUTTING DEVICE
Filed Sept. 28, 1966
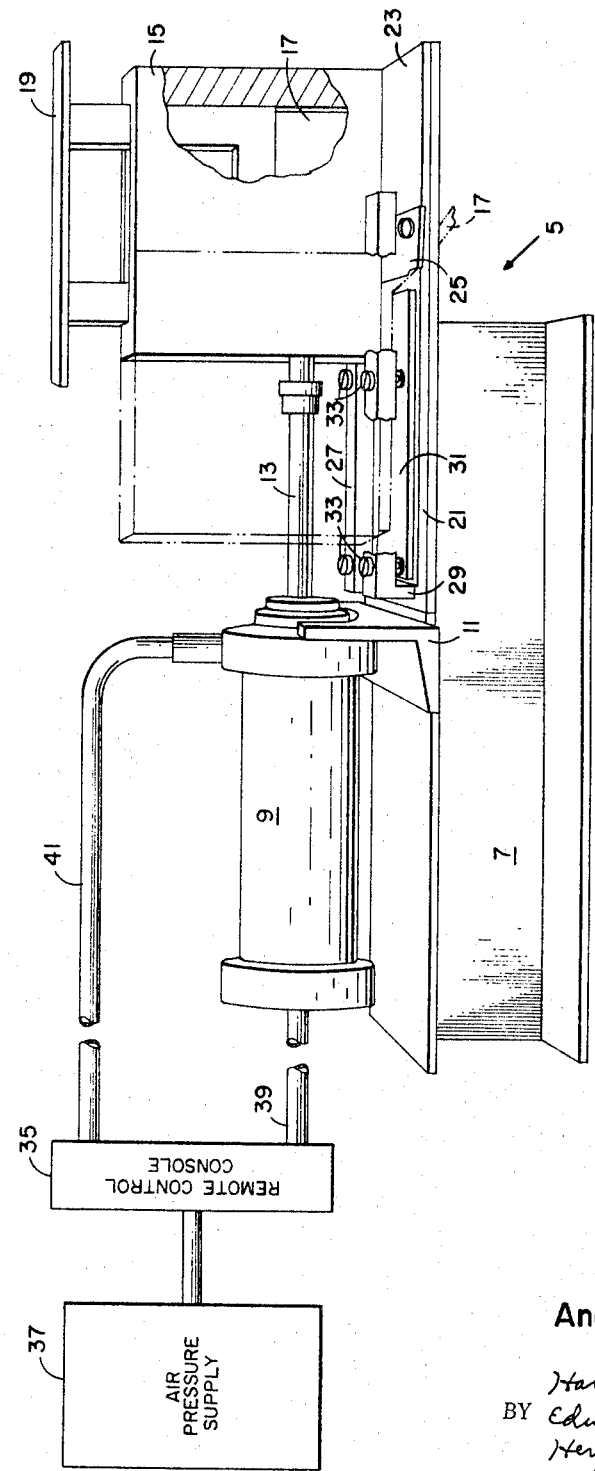
Andrew B. Nix,
INVENTOR.
BY Harry M. Saragovitz
Edward J. Kelly
Herbert Berl
Jack W. Voigt

United States Patent Office 3,404,591
Patented Oct. 8, 1968

3,404,591
SOLID PROPELLANT CUTTING DEVICE
Andrew B. Nix, Guntersville, Ala., assignor to the United States of America as represented by the Secretary of the Army
Filed Sept. 28, 1966, Ser. No. 583,121
3 Claims. (Cl. 83—4)

ABSTRACT OF THE DISCLOSURE

A solid propellant cutting device that may be operated from a remote position, for cutting uniform samples of propellant. The size of cut can be precisely adjusted before the cut is made. A reciprocating air cylinder is remotely controlled to operate a propellant holder. The holder moves a bulk propellant, disposed within the holder, against a cutting blade. The holder is guided by ways and an adjustable plate beneath the ways which determines the depth of cut.

---

The invention described herein may be manufactured, used, and licensed by or for the Government for governmental purposes without the payment to me of any royalty thereon.

This invention relates to a device for cutting solid propellants into slices and more specifically to a remotely controlled device for cutting solid propellants.

When cutting solid propellants for strand test burning, mechanical property testing and solid propellant rocket motor loading, it is hazardous to the operator to cut solid propellants with a conventional guillotine cutter which has been previously used. There is a constant possibility of fire or explosion while cutting solid propellants, and especially is it dangerous now, since the propellants to be cut are of higher energy content and thus much more highly explosive.

The old guillotine type cutter previously used to cut laboratory samples of solid propellants made it impossible to cut a uniform sample of a propellant because the operator had to hold the sample in place with one hand while moving the cutting blade with the other hand.

Applicant's cutting device is completely safe to use since it is adapted to be remotely controlled by air pressure and is much faster and more precise because the size of cut can be precisely adjusted before the cut is made.

It is, therefore, an object of this invention to provide a solid propellant cutting device which can be remotely controlled.

Another object of this invention is to provide a solid propellant cutting device which yields a more uniformly cut sample.

Further, it is an object of this invention to provide a solid propellant cutting device which is much faster and easier to use.

Accordingly, this device employs a reciprocating air cylinder, which can be remotely controlled, to operate a propellant holder which moves a bulk propellant disposed in the holder against a cutting blade. The propellant and holder are guided by ways and an adjustable plate beneath the ways for determining the depth of cut.

Other objects and many of the attendant advantages of this invention will be readily appreciated as the same becomes better understood by reference to the following detailed description when considered in conjunction with the accompanying drawing wherein:

The single figure is a pictorial view partially cut away of a solid propellant cutter according to the present invention.

Referring now to the drawing wherein for the purpose of illustration only, there is shown a solid propellant cutter 5 which consists of an elongated metal base member 7 upon which is mounted a two-way air cylinder 9 by means of a support bracket 11 that is rigidly secured to base 7. The air cylinder 9 is provided with a rod 13 which has one end attached to the air cylinder piston while the other end is attached to a rectangular box-shaped bulk propellant holder 15. Holder 15 is shown cut away in order to show the bulk propellant 17 therein and a weight 19 which is provided to urge the propellant downward while the cut is being made and to cause the propellant to be biased down when holder 15 is in the retracted position as shown by dotted lines.

In order to support holder 15 while it is being extended and retracted, a U-shaped plate 21 is rigidly attached to base 7 upon which is mounted a solid plate 23 forming a smooth surface upon which holder 15 slides. Adjacent the front edge of plate 23 is mounted a cutting blade 25 so that as holder 15 is extended the propellant is cut and the cutting falls away as shown by dashed lines of propellant 17 extending beneath plate 23 and through its opening defined by the uncovered portion of the U-shape in plate 21. A pair of ways 27 and 29, mounted on plate 21, are provided to guide the sides of holder 15 as it is extended and retracted during the cutting action.

In order that the depth of cut may be adjusted, ways 27 and 29 have a portion removed on the side adjacent plate 21 which allows them to be extended over blade 25 and receive a plate 31 which is adjustably secured to ways 27 and 29 by screws 33. By adjusting screws 33, plate 31 can be raised or lowered to the desired cutting depth since the propellant rests upon plate 31 when holder 15 is in the retracted position.

The cutter is remotely controlled by means of a remote control console 35 located outside of a bay area in which the cutting is to take place. An air pressure supply 37 is connected to control console 35, and lines 39 and 41 connect control console 35 to opposite sides of cylinder 9 for driving the piston therein. In operation, the remote control console is operated to cause air to be supplied to and exhausted from opposite sides of the piston in air cylinder 9 to cause propellant holder 15 to be reciprocated. As the propellant holder 15 and the propellant 17 inside are reciprocated, the propellant is cut into slices until the desired number of cuttings are made.

Obviously, many modifications and variations of the present invention are possible in the light of the above teachings. It is, therefore, to be understood that within the scope of the appended claims, the invention may be practiced otherwise than as specifically described.

What is claimed is:
1. A solid propellant cutting device comprising: a support means, a cutting blade mounted on said support means, said support means having an opening adjacent the cutting edge of said blade for allowing cuttings to pass therethrough, a solid propellant holder disposed on said cutting blade in slidable relation thereto, said holder having an opening therethrough adapted for receiving a bulk propellant to be cut and having means disposed therein for urging said bulk propellant against said blade, said support means including a vertically adjustable plate adjacent the cutting edge of said cutting blade and parallel to the lower edge of said holder for adjusting the depth of cut to be made, actuating means connected to said holder for moving said holder in reciprocative motion over said blade, said actuating means including a two-way air cylinder rigidly mounted on said support means, said air cylinder having a piston disposed therein, said cylinder having a rod mechanically connecting said piston to said propellant holder whereby the action of said piston is transmitted to said holder, an air pressure supply, a remote control console connected to said air pressure supply, a first air line connected to said two-way air cylinder for forcing air into said cylinder on one side of said piston, and a second air line connected to said cylinder for forcing air into the other side of said piston whereby said piston is reciprocated remotely.

2. A solid propellant cutting device as set forth in claim 1 wherein said support means further includes a pair of ways mounted adjacent the sides of said propellant holder thereby guiding said holder.

3. A solid propellant cutting device as set forth in claim 2 wherein said means for urging said propellant against said blade comprises a weight inserted into said opening of said holder over said bulk propellant.

References Cited

UNITED STATES PATENTS

| | | | |
|---|---|---|---|
| 548,145 | 10/1895 | Summers. | |
| 772,504 | 10/1904 | Dorsey | 146—168 |
| 787,614 | 4/1905 | Dorsey | 146—168 |
| 1,479,469 | 1/1924 | Kirnbauer | 146—168 |

WILLIAM S. LAWSON, *Primary Examiner.*